United States Patent
Nagase

[11] Patent Number: 5,877,799
[45] Date of Patent: Mar. 2, 1999

[54] ILLUMINATION CONTROL MEANS FOR IMAGE FORMING APPARATUS

[75] Inventor: Yukio Nagase, Tokyo, Japan

[73] Assignee: Canon Kabushiki Kaisha, Tokyo, Japan

[21] Appl. No.: 586,625

[22] Filed: Dec. 26, 1995

[30] Foreign Application Priority Data

Dec. 27, 1994 [JP] Japan .................................. 6-338006

[51] Int. Cl.$^6$ ........................................ B41J 2/47
[52] U.S. Cl. ........................................ 347/252
[58] Field of Search .................... 347/252, 260, 347/251, 240, 131, 247; 358/298

[56] References Cited

U.S. PATENT DOCUMENTS

| | | |
|---|---|---|
| 4,990,763 | 2/1991 | Shinada .................................. 250/205 |
| 5,017,944 | 5/1991 | Kitamura et al. ........................ 347/252 |
| 5,279,277 | 1/1994 | Tomita .................................... 250/235 |
| 5,341,165 | 8/1994 | Suzuki et al. .......................... 346/157 |

Primary Examiner—Mark O. Reinhart
Attorney, Agent, or Firm—Fitzpatrick, Cella, Harper & Scinto

[57] ABSTRACT

The present invention provides an image forming apparatus comprising a photosensitive member, scan means including light emitting elements for emitting laser beam to scan the photosensitive member, and control means for controlling the illumination of the light emitting elements. Wherein, when a shifting speed of the laser beam on the photosensitive member is v, a length of one side of a pixel is L and a maximum light emitting time of the light emitting element for each pixel is t, the control means controls the light emitting elements to satisfy a relation of t<L/v.

3 Claims, 10 Drawing Sheets

SENSITIVITY CHARACTERISTIC

STATIONARY EXPOSURE
DISTRIBUTION

SCAN EXPOSURE
DISTRIBUTION

EXPOSURE DISTRIBUTION
(SMALL SPOT DIAMETER)

EXPOSURE DISTRIBUTION
(SMALL SPOT DIAMETER)

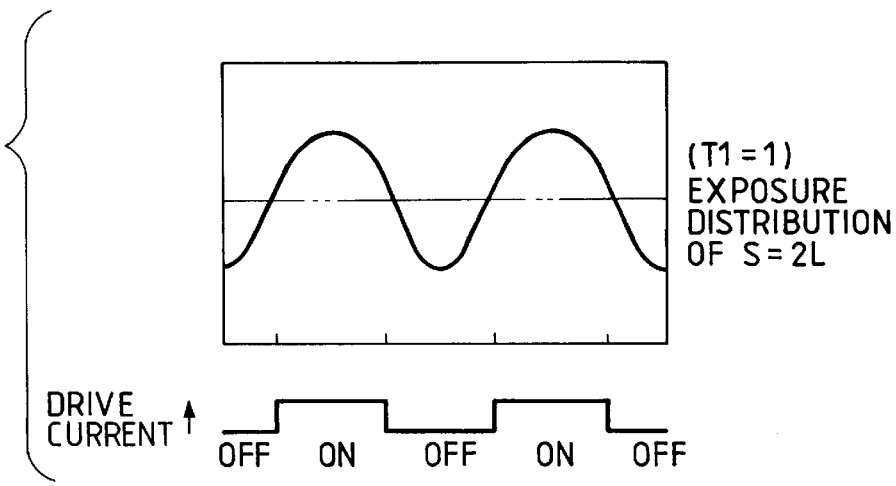
FIG. 7A — (T1 = 1) EXPOSURE DISTRIBUTION OF S=2L
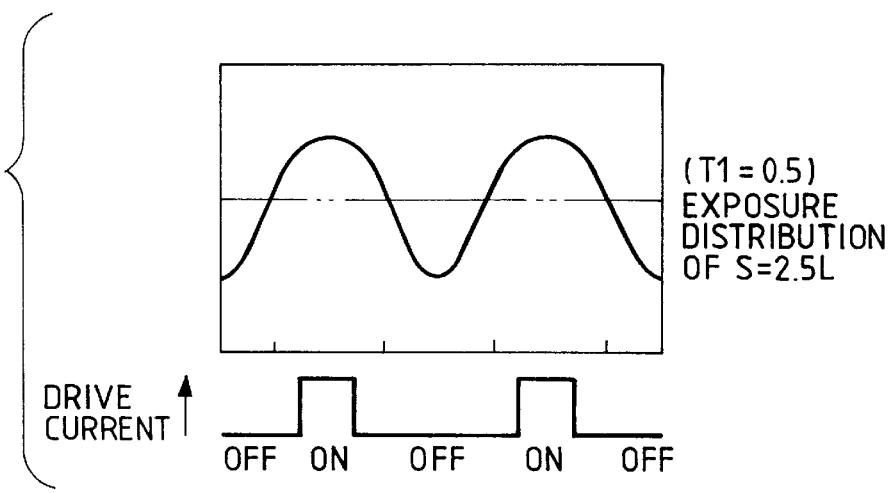
FIG. 7B — (T1 = 0.5) EXPOSURE DISTRIBUTION OF S=2.5L
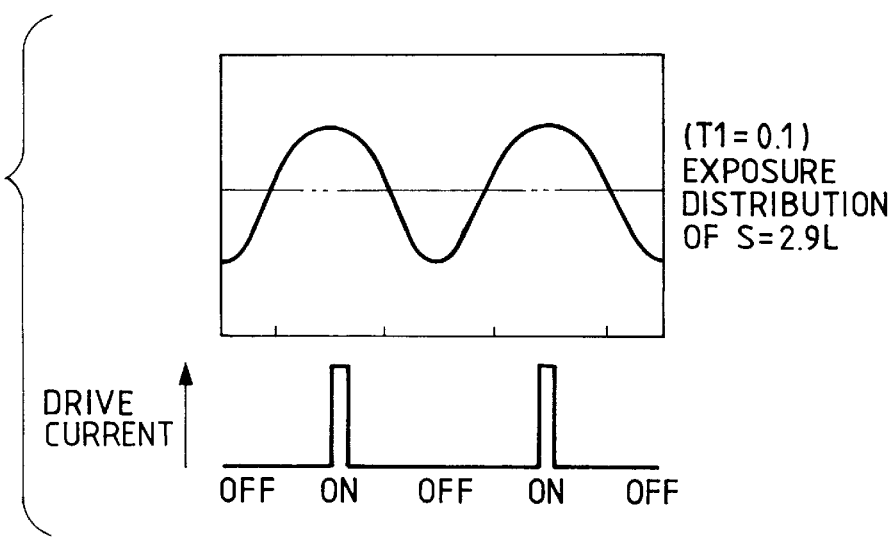
FIG. 7C — (T1 = 0.1) EXPOSURE DISTRIBUTION OF S=2.9L

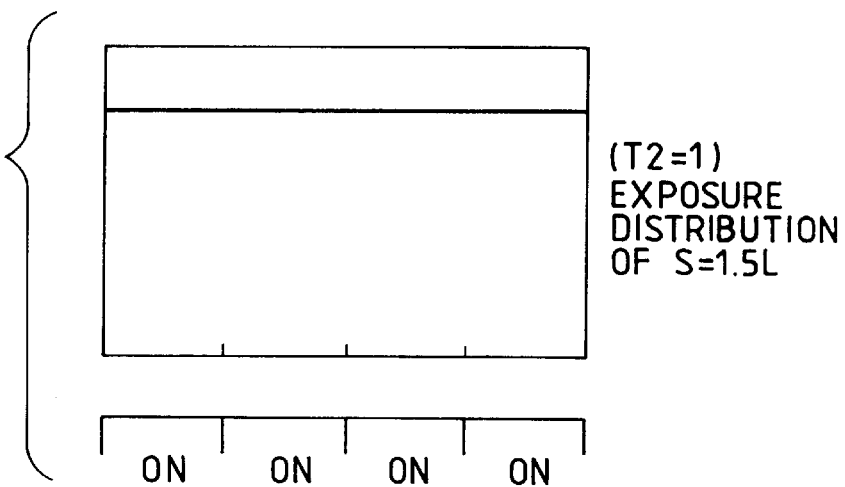
FIG. 10A (T2=1) EXPOSURE DISTRIBUTION OF S=1.5L
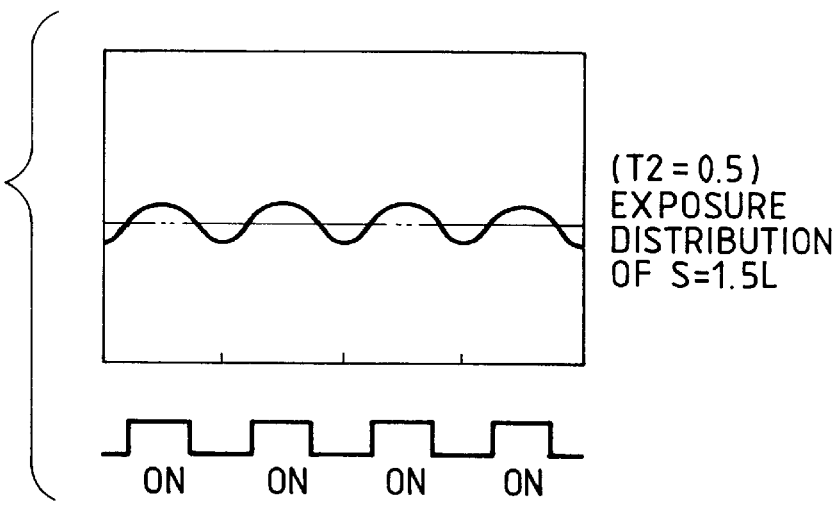
FIG. 10B (T2=0.5) EXPOSURE DISTRIBUTION OF S=1.5L
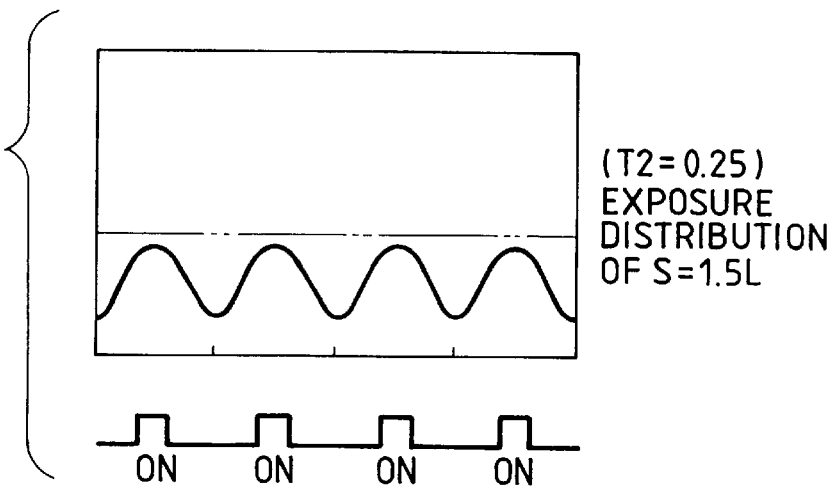
FIG. 10C (T2=0.25) EXPOSURE DISTRIBUTION OF S=1.5L

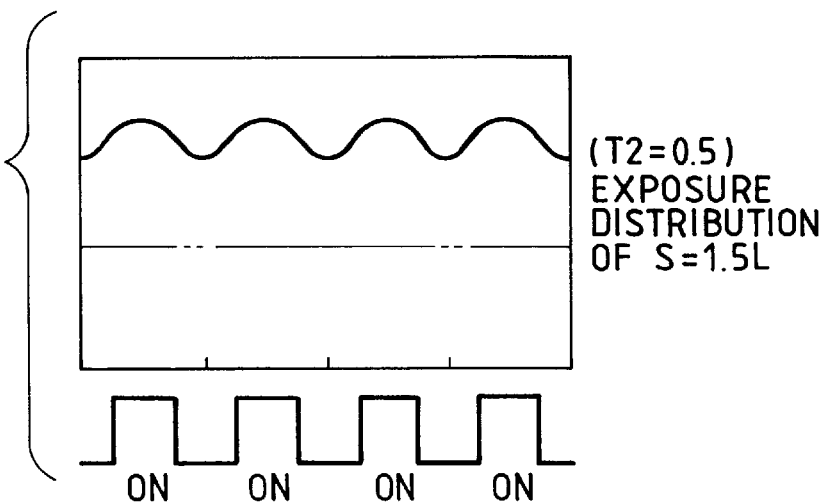
FIG. 11A  (T2=0.5) EXPOSURE DISTRIBUTION OF S=1.5L
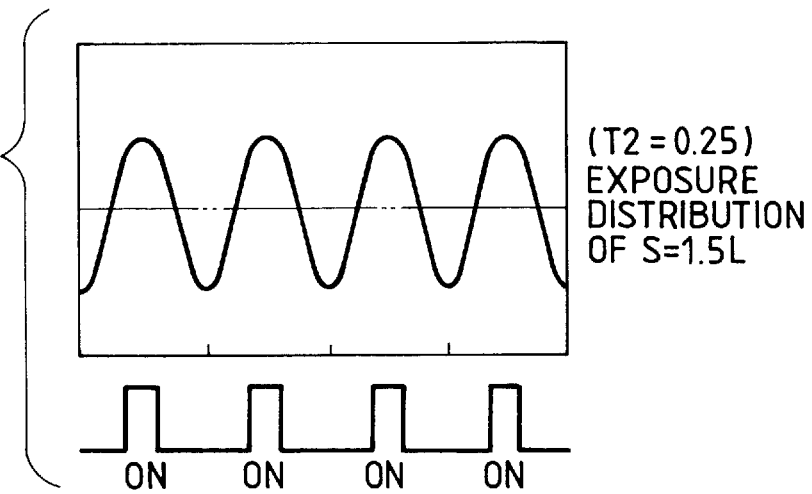
FIG. 11B  (T2=0.25) EXPOSURE DISTRIBUTION OF S=1.5L
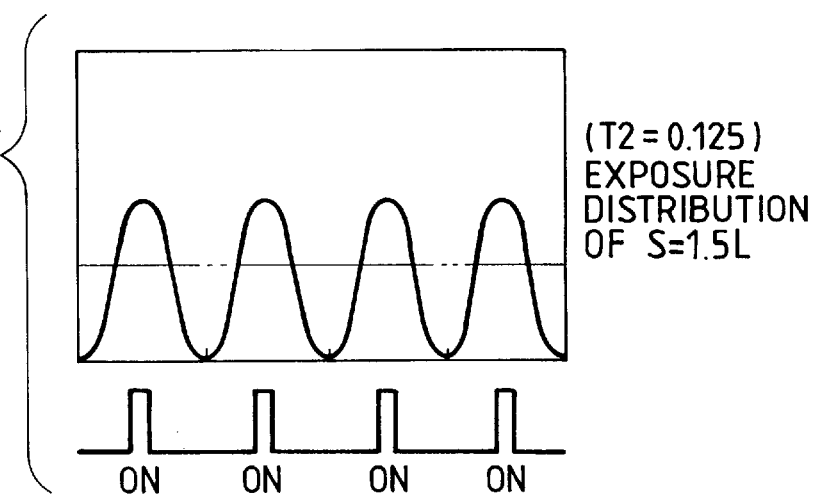
FIG. 11C  (T2=0.125) EXPOSURE DISTRIBUTION OF S=1.5L

ILLUMINATION CONTROL MEANS FOR IMAGE FORMING APPARATUS

BACKGROUND OF THE INVENTION

1. Field of the Invention

The present invention relates to an image forming apparatus such as a copying machine, a printer and the like, and, more particularly, it relates to an image forming apparatus for forming an image by scanning a photosensitive member by laser beam.

2. Related Background Art

Among image forming apparatuses, an electrophotographic laser printer is known as a high speed and low noise printer. Such laser printer generally performs binary recording wherein an image such as a character, figure and the like is formed by illuminating or not illuminating a laser beam onto a photosensitive member. In general, since the recording of the character, figure and the like does not require an intermediate tone, the printer can be simplified.

Recently, there has been proposed an intermediate tone pixel forming method wherein high resolving power can be obtained without decreasing the recording density. In this method, the intermediate tone image is formed by modulating a pulse width of laser beam illumination in response to an image signal (PWM). According to this PWM system, an image can be formed with high resolving power and high gradient. Thus, this system is inevitable for color image forming apparatuses wherein high resolving power and high gradient are required. According to this PWM system, it is possible to effect the area gradation of a dot formed by a beam spot for each pixel, and, thus, the intermediate tone can be achieved without reducing the pixel density (recording density).

Even in the image forming apparatuses wherein the image is formed by scanning the photosensitive member by the laser beam, the improvement in the resolving power has been requested. It is considered that a diameter of the laser beam spot is decreased to increase the resolving power. However, in order to decrease the diameter of the laser beam spot, power of a focusing lens must be increased, with the result that the image forming apparatus itself becomes bulky and expensive. Further, the depth of focus is reduced, thereby making the focusing on the photosensitive member unstable.

SUMMARY OF THE INVENTION

The present invention aims to eliminate the above-mentioned conventional drawbacks, and an object of the present invention is to provide an image forming apparatus which can achieve high resolving power.

Another object of the present invention is to provide an image forming apparatus in which a substantial spot diameter of a laser beam can be reduced.

A further object of the present invention is to provide an image forming apparatus comprising a photosensitive member, a scan means including light emitting elements for emitting laser beam to scan the photosensitive member, and a control means for controlling the illumination of the light emitting elements. Wherein, when a shifting speed of the laser beam on the photosensitive member is v, a length of one side of a pixel is L and a maximum light emitting time of the light emitting element for each pixel is t, the control means controls the light emitting elements to satisfy a relation of $t < L/v$.

The other objects of the present invention will be apparent from the following detailed description of the present invention.

BRIEF DESCRIPTION OF THE DRAWINGS

FIG. 3A shows a sensitivity feature, FIG. 3B shows a spot distribution feature and FIG. 3C shows a latent image distribution;

FIGS. 7A to 7C are graphs showing exposure distribution when light emitting time is changed;

FIGS. 10A to 10C are graphs showing exposure distribution when light emitting time is changed;

FIGS. 11A to 11C are graphs showing exposure distribution when light emitting time is changed.

DETAILED DESCRIPTION OF THE PREFERRED EMBODIMENTS

The present invention will now be explained in connection with embodiments thereof with reference to the accompanying drawings.

(First Embodiment)

Figure 1:
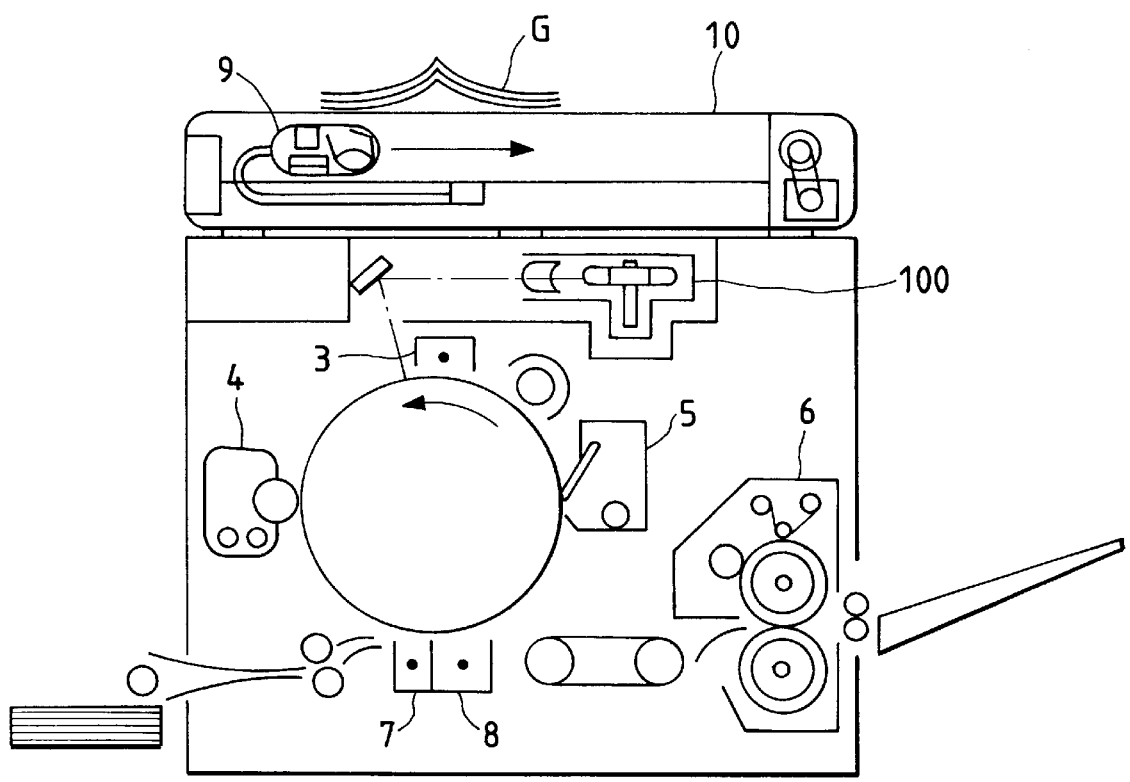
FIG. 1 is a schematic elevational sectional view of an image forming apparatus according to a preferred embodiment of the present invention.

In FIG. 1 showing an image forming apparatus according to a preferred embodiment of the present invention, an original G is set on an original support 10 with an imaged surface to be copied facing downward. Then, a copy cycle is started by depressing a copy button.

By illuminating and scanning the original by means of a unit 9 comprising an original illumination lamp, short focus lens array and a CCD sensor, light reflected from the original is focused on the CCD sensor by the short focus lens array. The CCD sensor comprises a light receiving portion, a transfer portion and an output portion. In the light receiving portion, a light signal is converted into an electric signal, and, in the transfer portion, the electric signals are successively transferred to the output portion in synchronous with clock pulses, and, in the output portion, a charge signal is converted into a voltage signal, thereby outputting an amplified signal having low impedance.

In this way, the analogue signals are converted into the digital signals by conventional image treatment, and the digital signals are outputted to a printer portion. In the printer portion, an electrostatic latent image is formed in response to the image signal in the following manner.

A photosensitive drum (photosensitive member) 1 is rotated around a rotational axis thereof at a predetermined peripheral speed; meanwhile, the photosensitive drum is uniformly charged with positive polarity or negative polarity by a charger 3. Then, by scanning the uniformly charged surface of the photosensitive drum by laser beam modulated in response to the image signal, an electrostatic latent image corresponding to an image on the original is formed on the surface of the photosensitive drum 1.

Figure 2:
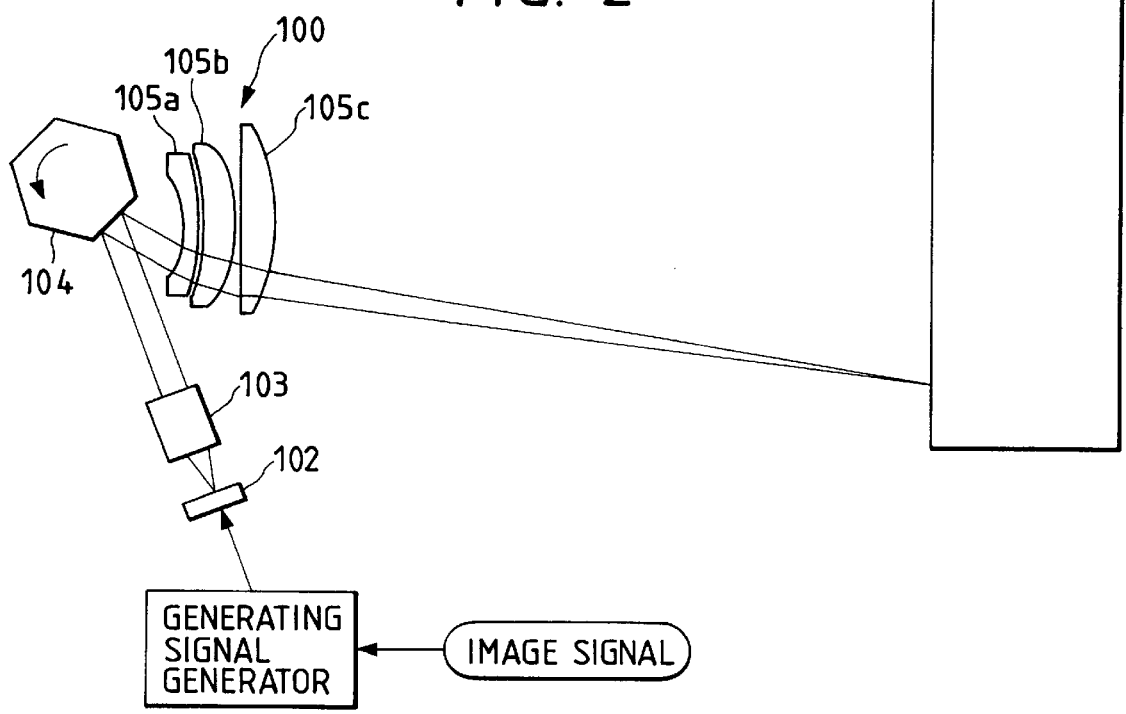
FIG. 2 is a schematic illustration of a laser scan portion of the image forming apparatus according to the preferred embodiment.

FIG. 2 is a schematic illustration showing a laser scan portion (scan means) 100 for scanning the drum by the laser beam.

When the photosensitive drum is scanned by the laser scan portion 100, first of all, a solid laser element 102 is lightened by a light emitting signal generator 101 in response to the image signal. The laser beam emitted from the laser scan portion 100 is converted into substantially parallel light flux by means of collimater lens system 103, and further is deflected by a rotatable polygon mirror 104 rotated in a direction shown by the arrow b. The laser beam deflected by the polygon mirror is focused on the surface of the surface 106 (to be scanned) of the photosensitive drum 1 through fθ lenses 105a, 105b, 105c as a spot. In this way, one image scan distribution is formed on the scanned surface 106 by one laser scan. For each laser scan, by scrolling the scanned surface 106 by a predetermined amount in a direction (sub scan direction) perpendicular to the scan direction, the scan distribution corresponding to the image signal is formed on the scanned surface 106.

The electrostatic latent image formed on the photosensitive drum 1 in this way is developed by a developing device 4 to form a toner image which is in turn electrostatically transferred onto a transfer material by means of a transfer charger 7. Thereafter, the transfer material is electrostatically separated from the photosensitive drum by a separation charger 8, and the separated transfer material is sent to a fixing device 6, where the toner image is fixed to the transfer material. Then, the transfer material is discharged out of the apparatus as an image output copy.

On the other hand, after the toner image was transferred to the transfer material, the residual toner remaining on the surface of the photosensitive drum 1 is removed by a cleaner 5 for preparation for next image formation.

Figure 3A:
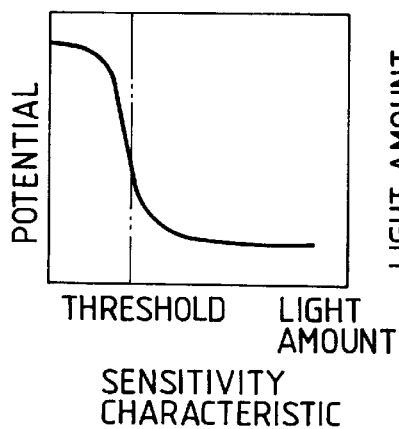
FIGS. 3A to 3C are graphs showing features of a photosensitive member of the image forming apparatus according to the preferred embodiment, where

In the illustrated embodiment, the photosensitive drum 1 has a sensitivity feature as shown in FIG. 3A. As seen from FIG. 3A, in a range of a small light amount, the charged potential on the photosensitive drum 1 is almost not decreased (potential attenuation amount is small), and, when a predetermined threshold light amount value is exceeded, the light sensitivity is greatly increased to increase the potential attenuation amount. The photosensitive drum 1 is formed from material in which pigment particles having a diameter of 0.01–0.5 μm are dispersed in high resistance binder. For example, fine particles of α-copper phthalocyanine are dispersed in mixture of polyester resin and melamine resin.

Figure 3B:
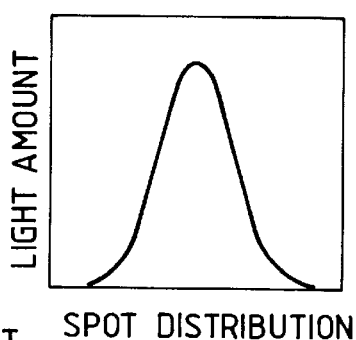
Figure 3C:
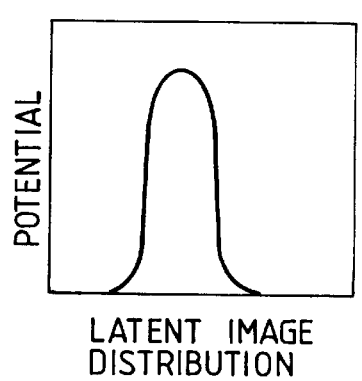

When the laser spot having Gauss distribution as shown in FIG. 3B is exposed on the photosensitive drum 1 having the above-mentioned sensitivity feature, in the range of small light amount, since the sensitivity is small, a latent image pattern as shown in FIG. 3C in which side lobes of the Gauss distribution are cut, with the result that the latent image dot smaller than the laser spot can be formed, thereby achieving high resolving power.

However, the inventors found that the actual spot diameter becomes greater than the desired spot diameter since the laser beam is shifted in the main scan direction.

Figure 4A:
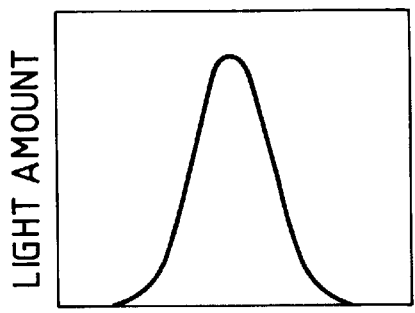
FIG. 4A is a graph showing stationary exposure distribution.
Figure 4B:
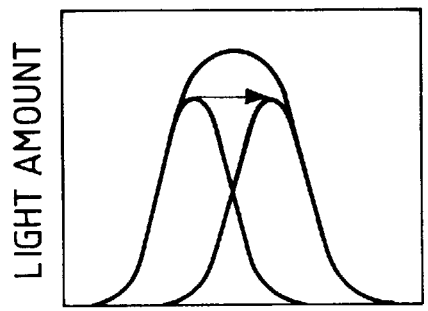
FIG. 4B is a graph showing scan exposure distribution.

FIG. 4A shows a beam spot configuration when the laser beam is not scanned (stationary condition). However, since the laser beam is actually shifted in the direction shown by the arrow (main scan direction) as shown in FIG. 4B, when the laser is emitted by a time corresponding to one pixel, the spot is substantially enlarged. Even when such scan spot distribution is combined with the photosensitive drum 1 having the sensitivity feature as shown in FIG. 3A, the obtained latent image dot has a dot diameter greater than the dot diameter in the stationary spot distribution, thereby preventing the achievement of the high resolving power.

Figure 5A:
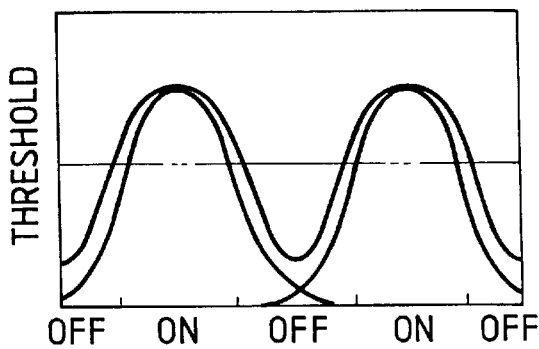
FIGS. 5A and 5B are graphs showing exposure distribution regarding ON/OFF pattern.
Figure 5B:
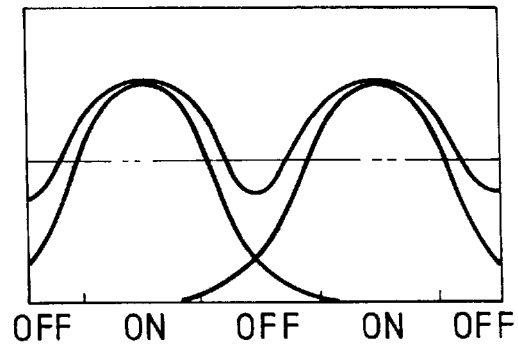

Another problem regarding the enlargement of the exposure distribution due to the scan spot is that, when an ON/OFF pattern (every one pixel) as shown in FIG. 5A is recorded, the overlap between the side lobes of the scan spot exposure distribution cannot be negligible, with the result that, as shown in FIG. 5B, the integral light amount of the pixel to be OFF is increased.

In particular, as is in the illustrated embodiment, when there is the binary feature having the threshold value regarding the sensitivity feature of the photosensitive drum, if the integral light amount of the pixel to be OFF exceeds the threshold value regarding the sensitivity feature of the photosensitive drum, the dot pattern having high resolving power cannot be obtained. Of course, although the problem can be solved by making the spot diameter small enough to the pixel size, as mentioned above, there arises a problem regarding the cost and accuracy of the apparatus. Thus, as the resolving power is increased, it will be more difficult to provide a desirable apparatus.

The present invention can improve the high resolving power with a laser spot having a smaller diameter enough to a pixel size. The key point in the present invention is to suppress the enlargement of the actual spot due to the scan (shift) of the laser spot and the enlargement of the side lobes of exposure distribution.

To achieve this, the light emitting time rate of the laser beam source for each pixel is made smaller than one pixel driving time period. That is to say, when a shifting speed of the laser beam on the photosensitive member is v, a length of one side of the pixel is L and a maximum light emitting time of the laser beam emitting element for each pixel is t, the light emitting elements are controlled to satisfy a relation of t<L/v.

Figure 12:
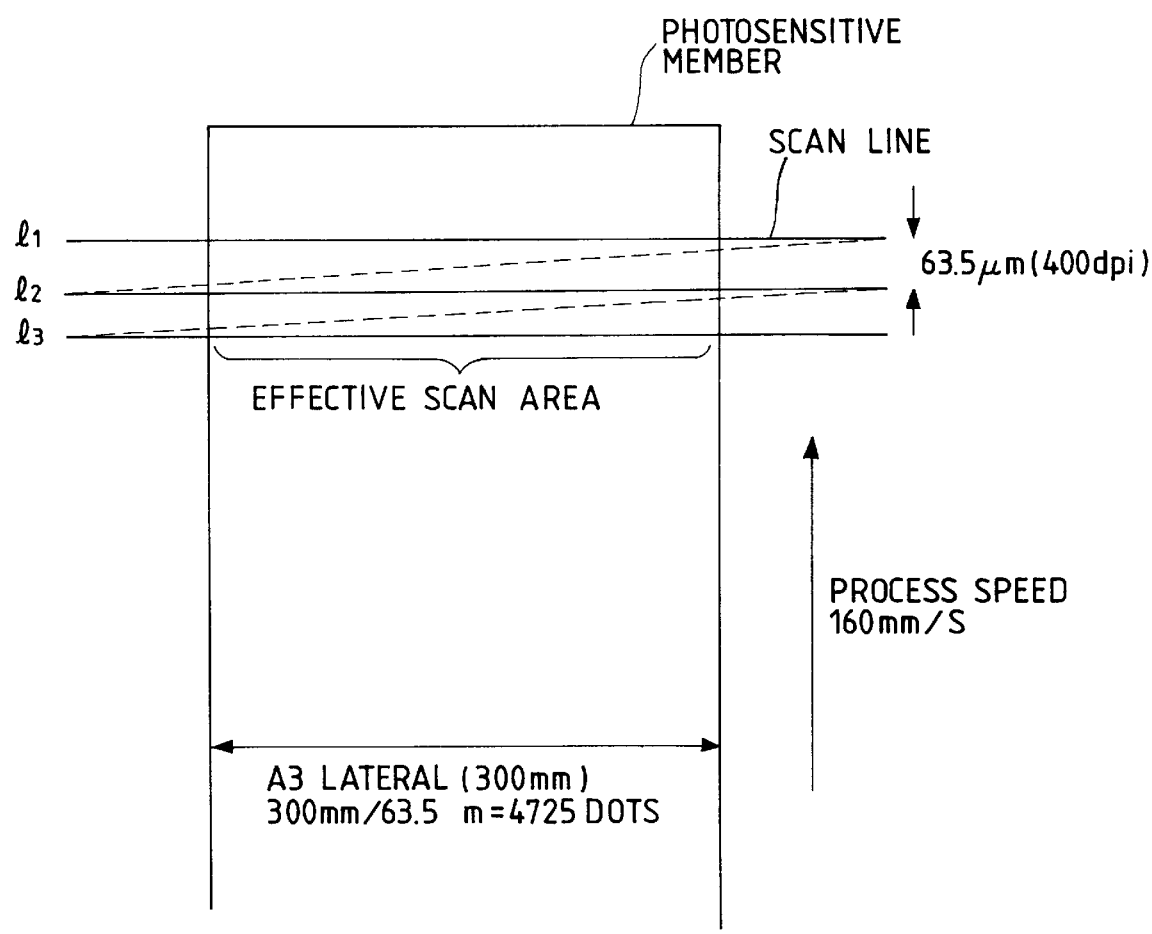
FIG. 12 is a development view of the photosensitive member for explaining a maximum scan time per each pixel.

Explaining in more detail, as shown in FIG. 12, when an image forming speed regarding the recording material (peripheral speed of the photosensitive drum) is 160 mm/sec, recording density is 400 dpi (dimension of each pixel is 63.5 μm×63.5 μm), a ratio between an effective scan length and an entire scan length is 51.2% and a length of the photosensitive drum corresponding to the effective scan area is 300 mm, scan time $t_1$ for each pixel becomes as follows:

$$t_1 = (63.5 \ \mu m \div 160 \ mm/sec) \times 0.512/4725 = 43 \ nsec.$$

Accordingly, in the illustrated embodiment, the maximum scan time t for each pixel is selected to t<43 nsec.

Alternatively, the following representation can be made. Regarding the ON/OFF pattern every one pixel, when the light emitting time rate T1 of the laser beam source is 1, the light emitting time rate T1 of the laser beam source may be set to satisfy the following relation with respect to the one pixel driving time:

$$T1 < (3L-S)/L.$$

Where, L is pixel size, and S is laser spot $1/e^2$ diameter (diameter at $1/e^2 \cong 14\%$ regarding the maximum value in the Gauss distribution; referred to mereby as "spot diameter" hereinafter), and, 0<T1<1.

Thus, when the laser spot is sufficiently greater than the pixel size, by sufficiently shortening the drive pulse with respect to the one pixel driving time, the enlargement of the actual spot can be eliminated.

In the binary printer having high resolving power and using the laser beam according to the illustrated embodiment, the ON/OFF pattern may be recorded by the ability required to perform the binary recording, i.e. recording resolving power. Accordingly, when a pattern such as ON/OFF/ON/OFF is outputted, it is important that the integral light amount of the pixel to be OFF does not exceed the threshold sensitivity value of the photosensitive drum due to the enlargement of the side lobes of the laser spot.

From the various tests, it was found that, in the case where the photosensitive drum 1 having binary sensitivity feature as the illustrated embodiment is used, when the laser emitting time per one pixel is shortened as mentioned above, the binary recording can be effected so long as the spot diameter is greater than the pixel size by twice or less. For example, it was found that, when the resolving power is 600 dpi, so long as the spot diameter has about 80–85 μm or less with respect to the pixel size of about 42 μm, the ON/OFF pattern can be developed by the subsequent developing process.

However, if the spot diameter exceeds the above value, the exposure distribution between the pixels cannot be negligible, and, it was found that, even if the photosensitive drum as the illustrated embodiment is used, it is difficult to form the stable ON/OFF pattern. Further, from the similar test regarding the resolving power of 1200 dpi, it was found that the ON/OFF pattern can be developed by the subsequent developing process so long as the spot diameter has about 40 μm or less with respect to the pixel size of about 21 μm.

In this way, by shortening the laser beam emitting time with respect to one pixel driving time as the above-mentioned equation, even when the spot diameter greater than the above-mentioned diameter is used, the enlargement of the spot due to scan can be reduced, with the result that the enlargement of the latent image can be offset.

Figure 6A:
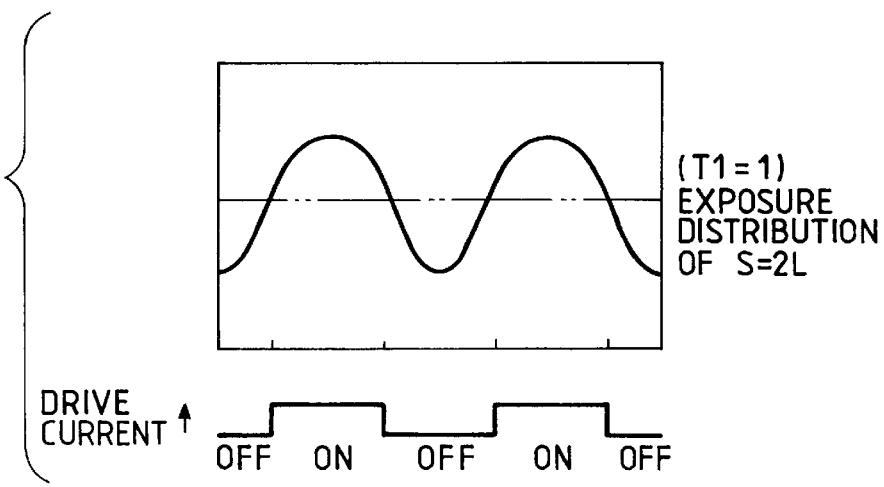
FIGS. 6A to 6C are graphs showing exposure distribution when light emitting time is changed.
Figure 6B:
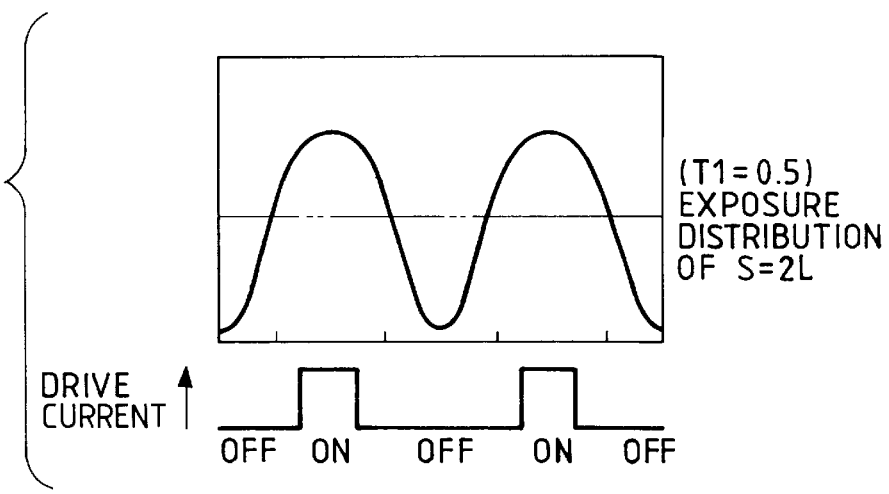
Figure 6C:
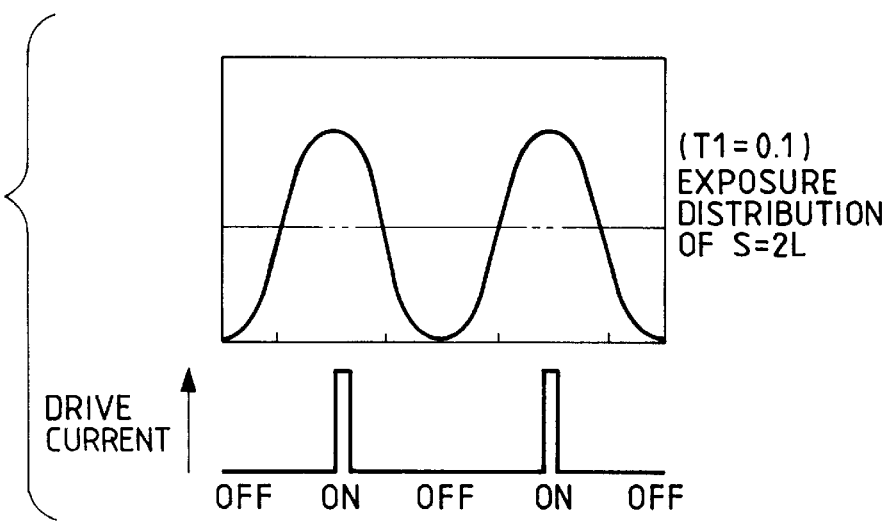

FIGS. 6A to 6C show the exposure distribution when the spot diameter is greater than the pixel size by about 2 times (S=2L). As seen from FIGS. 6A to 6C, when the rate T1 of the light emitting time is set to 0.5, the scan direction for each pixel can be reduced to half, with the result that the enlargement of the latent image due to the scan can be reduced to half of the pixel enlargement. Further, as the light emitting time rate is decreased, the latent image has higher contrast, thereby permitting the stable binary recording. Incidentally, when the light emitting time is decreased, the integral light amount of the laser beam is also decreased. Thus, in the illustrated embodiment, as shown in FIGS. 6A to 6C, as the light emitting time is decreased, the current applied to the light emitting element is increased, thereby suppressing the reduction of the integral light amount. Further, by decreasing the scan direction, a relatively great spot diameter can be used.

From the above-mentioned equation, for example, when the rate is 0.1, the enlargement of the latent image due to the scan can be substantially neglected, with the result that the available spot diameter can be increased to two or three times of the conventional spot diameter.

FIGS. 7A to 7C show the exposure distributions obtained when S=2L (T1=1), S=2.5L (T1=0.5) and S=2.9L (T1=0.1), respectively. When the large spot is used, by decreasing the light emitting rate T1, similar exposure patterns can be obtained.

This is important to achieve the output having high resolving power for providing recording density of 600 dpi or more, and, in the illustrated embodiment, the large spot can be used and a cheap printer having high resolving power can be obtained.

By the way, when the light emitting rate is decreased, since the integral light amount is also decreased, it is necessary to increase the laser beam emitting amount in dependence upon the light emitting rate (for example, when the light emitting rate is 0.5, the laser beam emitting amount is increased to twice).

(Second Embodiment)

Next, a second embodiment wherein the multi tone recording can be effected by modulating a pulse width of the laser in one pixel will be explained.

Figure 8:
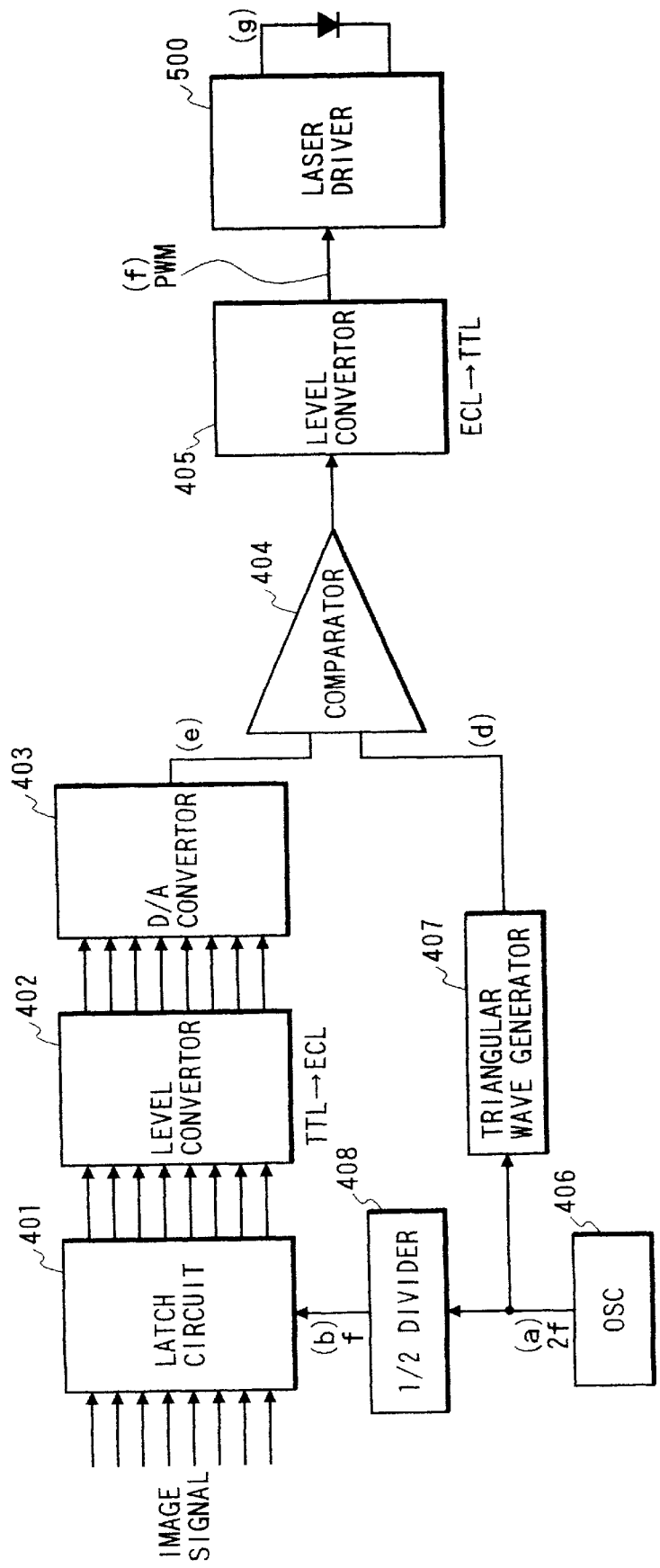
FIG. 8 is a block diagram of the laser scan portion of the image forming apparatus.

In FIG. 8 showing a circuit block diagram depicting one example of a pulse width modulation circuit, the reference numeral 401 denotes a TTL latch circuit for latching an 8-bit digital image signal; 402 denotes a level converter for converting a TTL logic level into a high speed ECL logic level; 403 denotes a D/A converter for converting the ECL logic level into an analogue signal; 404 denotes an ECL comparator for generating a PWM signal; 405 denotes a level converter for converting the ECL logic level into the TTL logic level; 406 denotes a clock oscillator for emitting a clock signal 2f; 407 denotes a triangular wave generator for generating a substantially ideal triangular wave signal in synchronous with the clock signal 2f; and 408 denotes a ½ divider for ½ dividing the clock signal 2f to form an image clock signal f.

With this arrangement, the clock signal 2f has frequency greater than that of the image clock signal f by twice. Incidentally, in order to operate the circuit at a high speed, there are provided ECL logic circuits.

Figure 9:
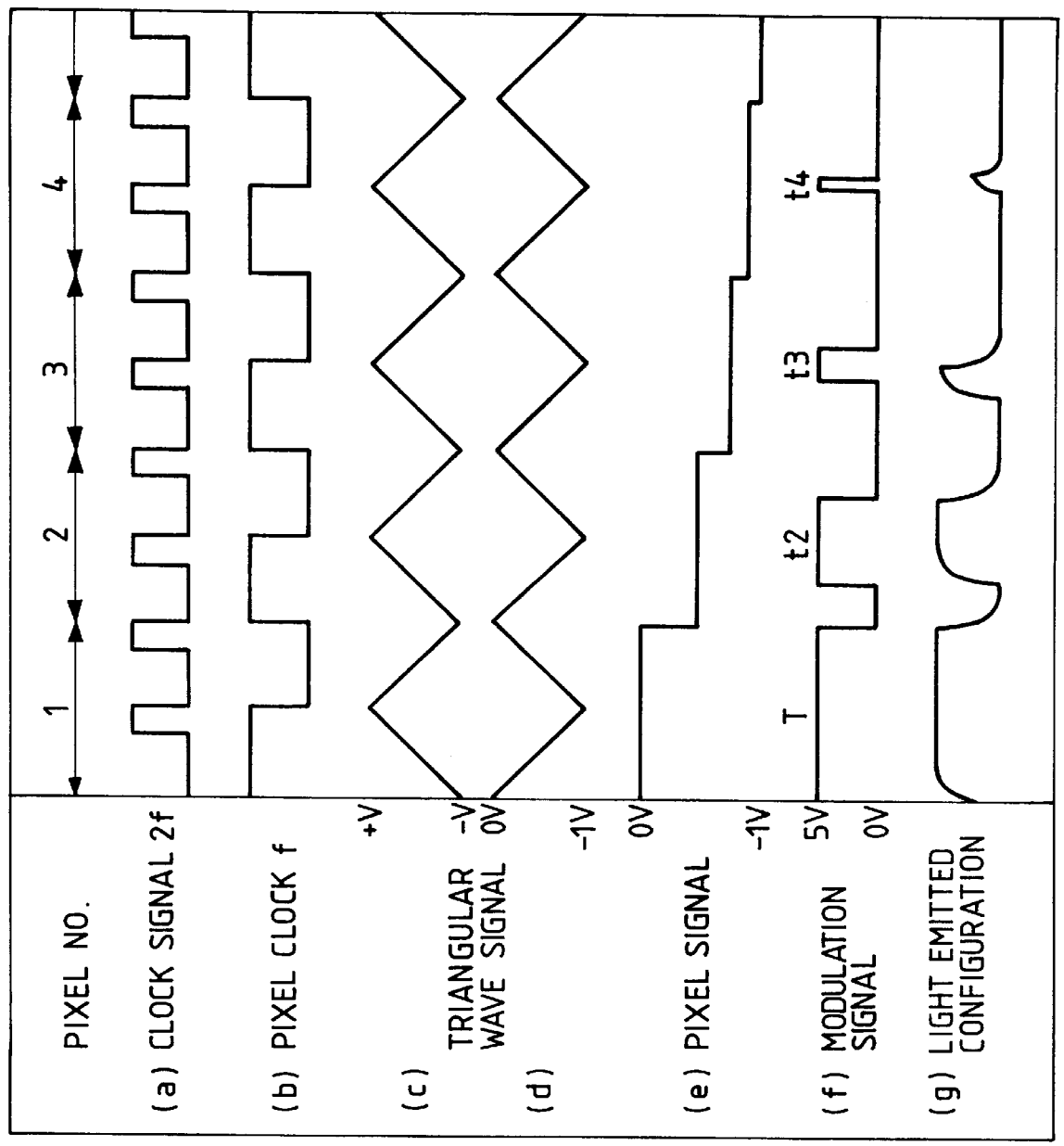
FIG. 9 is a timing chart of the laser scan portion of the image forming apparatus.

Now, the above-mentioned circuit will be explained with reference to a timing chart shown in FIG. 9. A signal a indicates the clock signal 2f, and a signal b indicates the image clock signal f, and these signals are associated with the image signal. Further, in the triangular wave generator 407, in order to maintain the duty ratio of the triangular wave signal to 50%, the triangular signal c is generated after the clock signal 2f is ½ divided. Further, the triangular signal c is converted into the ECL level (0 to −1 V) to form a triangular wave signal d.

On the other hand, the image signal is changed with 256 tones from 00h (white) to FFh (black). Incidentally, the symbol "h" is 16-th decimal number. And, the image signal e is depicted as ECL voltage levels D/A converted from the image signal. For example, a first pixel has FFh voltage (black pixel level), a second pixel has 80 h voltage (intermediate tone level), a third pixel has 40 h voltage (intermediate tone level) and a fourth pixel has 20 h voltage (intermediate tone level).

The comparator 404 generates PWM signals having pulse widths T, $t_2$, $t_3$, $t_4$ corresponding to the pixel densities to be formed, by comparing the triangular wave signal d with the image signal e. The PWM signal is converted into the TTL level of 0 V or 5 V to form a PWM signal f which is in turn sent to a drive circuit 500. By changing the exposure time for each pixel in accordance with the PWM signal value so obtained, 256 tones can be achieved for pixels.

In the first embodiment, since binary value, the ON/OFF patterns for two pixels may be formed. However, in the second embodiment, since the ON/OFF of the laser is effected in one pixel and the dot diameter is changed at that rate to perform the area gradation, the unstability in dot formation due to the influence of the side lobes between the adjacent pixels becomes more serious in comparison with the first embodiment. Such an example is shown in FIGS. 10A to 10C.

FIGS. 10A to 10C show light amounts obtained when the spot diameter is greater than the pixel size by 1.5 times (S=1.5L). FIG. 10A shows a case where the light emitting time rate T2 is 1 (initial condition), FIG. 10B shows a case of T2=0.5, and FIG. 10C shows a case of T2=0.25.

Particularly, in FIG. 10B, since the light amount exists around the threshold value, for each pixel, there arises positional deviation leading to reduction in charge potential, thereby making the image unstable. On the other hand, in FIG. 10C, since the light amount cannot exceed the threshold value, there is no reduction in charge potential, with the result that the image formation is not effected.

According to the multi-value printer having high resolving power of the illustrated embodiment, the above-mentioned problems can be solved, and, in an image forming apparatus wherein the multi tone recording can be effected by pulse-width-modulating the laser emitting time, the substantial enlargement of the spot diameter can be suppressed even when the laser beam is shifted (scanned) on the photosensitive member.

In the illustrated embodiment embodying such an apparatus, when a shifting speed of the laser beam on the photosensitive member is v, a length of one side of the pixel is L and a maximum light emitting time of the laser beam emitting element for each pixel is t, the light emitting elements are controlled to satisfy a relation of t<L/v.

Alternatively, the light emitting time rate T2 of the laser beam source may be set to satisfy the following relation with respect to the one pixel driving time:

$$T2<(2L-S)/L.$$

where, L is pixel size, and S is laser spot $1/e^2$ diameter (diameter at $1/e^2 \cong 14\%$ regarding the maximum value in the Gauss distribution; referred to merely as "spot diameter" hereinafter), and, 0<T2<1.

The pulse width modulation is effected within a range which does not exceed the light emitting time rate T2 of the laser source. Thus, when the laser spot is sufficiently greater than the pixel size, by sufficiently shortening the laser drive pulse with respect to the one pixel driving time, the enlargement of the actual spot can be eliminated.

In the multi-value printer having high resolving power according to the illustrated embodiment, the ON/OFF pattern must be recorded by the ability required to perform the multi-value recording, i.e. within one pixel of the recording resolving power. Accordingly, when the PWM modulation is effected within one pixel and the intermediate tone recording is performed, it is important that the integral light amount between the adjacent pixels does not exceed the threshold sensitivity value of the photosensitive drum due to the enlargement of the side lobes of the laser spot.

From the various tests, it was found that, in the case where the photosensitive drum 1 having binary sensitivity feature as the illustrated embodiment is used, the multi-value recording can be effected so long as the spot diameter is equal to the pixel size. For example, it was found that, when the resolving power is 600 dpi, so long as the spot diameter has about 42 μm or less with respect to the pixel size of about 42 μm, the gradient image can be developed by the subsequent developing process. However, if the spot diameter exceeds the above value, the influence of the exposure distribution between the pixels cannot be negligible, and, it was found that, even if the photosensitive drum as the illustrated embodiment is used, it is difficult to form the stable gradation. Particularly, in the intermediate tone zone having long pulse width time, since the integral light amount between the adjacent pixels exceeds the sensitivity threshold value of the photosensitive drum 1 by the enlargement of the actual spot due to the scan and by the enlargement of the side lobes, the area gradient recording cannot be effected.

In the illustrated embodiment, by pulse-width modulating the laser beam emitting time with respect to one pixel driving time within the short range as the above-mentioned equation, even when the spot diameter greater than the above-mentioned diameter is used, the enlargement of the spot due to scan can be reduced, with the result that the enlargement of the latent image can be offset. For example, when the rate T2 of the maximum light emitting time is set to 0.5, the scan direction for each pixel can be reduced to half, with the result that the enlargement of the latent image due to the scan can be reduced to half of the pixel enlargement. As a result, as the light emitting time rate is decreased, the latent image has higher contrast, thereby permitting the stable multi-value recording.

Such an example is shown in FIGS. 11A to 11C which show light amounts obtained when the spot diameter is greater than the pixel size by 1.5 times (S=1.5L). FIG. 11A shows a case where the light emitting time rate T2 is 0.5 (initial condition), FIG. 11B shows a case of T2=0.25, and FIG. 11C shows a case of T2=0.125. Further, since the scan distance is reduced, a relatively large spot diameter can be used.

From the above equation, for example, when the rate T2 is 0.1, the enlargement of the latent image due to the scan can be substantially neglected, with the result that the available spot diameter can be increased to about two times of the conventional spot diameter.

This is important to achieve the output having high resolving power for providing recording density of 600 dpi or more, and, in the illustrated embodiment, the large spot can be used and a cheap printer having high resolving power can be obtained.

By the way, when the initial light emitting rate is decreased, since the integral light amount is also decreased, it is necessary to increase the laser beam emitting amount in dependence upon the light emitting rate (for example, when the light emitting rate is 0.5, the laser beam emitting amount is increased to twice). This can be understood from the comparison between heights of the waves shown in FIGS. 10A and 11A.

The present invention is not limited to the illustrated embodiments, but various alterations may be effected within the scope of the present invention.

What is claimed is:

1. An image forming apparatus comprising:
    a photosensitive member;
    scan means including light emitting element for emitting laser beam to scan said photosensitive member; and
    control means for controlling the illumination of said light emitting element;
    wherein when a shifting speed of the laser beam on said photosensitive member is v, a length of one pixel in a scanning direction is L and a maximum light emitting time of said light emitting element for each pixel is t, said control means controls said light emitting element to satisfy a relation of t<L/v.

2. An image forming apparatus according to claim 1, wherein said scan means includes a polygon mirror for deflecting light emitted from said light emitting element.

3. An image forming apparatus according to claim 1, wherein said control means controls said light emitting element to satisfy a relation of T1<(3L−S)/L, when a light emitting time with respect to laser beam scan time for each pixel is T1, and a spot diameter of the laser beam is S.

* * * * *

UNITED STATES PATENT AND TRADEMARK OFFICE
CERTIFICATE OF CORRECTION

PATENT NO. : 5,877,799

DATED : March 2, 1999

INVENTOR(S) : Yukio NAGASE

It is certified that error appears in the above-identified patent and that said Letters Patent is hereby corrected as shown below:

<u>Title PAGE, Primary Examiner</u>:

"Mark O. Reinhart" should read --Mark J. Reinhart--.

<u>COLUMN 4</u>:

Line 66, "mereby" should read --merely--.

<u>COLUMN 8</u>:

Line 48, "light" should read --a light--; and
Line 49, "laser" should read --a laser--.

Signed and Sealed this

Thirty-first Day of August, 1999

Attest:

Q. TODD DICKINSON

*Attesting Officer*  *Acting Commissioner of Patents and Trademarks*